United States Patent
Sarkar et al.

(10) Patent No.: US 8,203,947 B1
(45) Date of Patent: Jun. 19, 2012

(54) INTERLACED CONTROL CHANNEL

(75) Inventors: Debasish Sarkar, Irvine, CA (US);
Siddharth S. Oroskar, Overland Park, KS (US); Sachin R. Vargantwar, Overland Park, KS (US); Manoj Shetty, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 737 days.

(21) Appl. No.: 12/351,400

(22) Filed: Jan. 9, 2009

(51) Int. Cl.
*H04J 1/16* (2006.01)
(52) U.S. Cl. ........................................ 370/230
(58) Field of Classification Search .................. 370/329, 370/229, 230, 235, 204, 320, 332, 335
See application file for complete search history.

(56) References Cited

U.S. PATENT DOCUMENTS

| | | | |
|---|---|---|---|
| 2008/0026691 A1 * | 1/2008 | Gao | 455/7 |
| 2009/0262720 A1 * | 10/2009 | Kwon et al. | 370/342 |

* cited by examiner

*Primary Examiner* — Huy Vu
*Assistant Examiner* — Dady Chery

(57) ABSTRACT

A method and system is disclosed for interlaced control channel. When a RAN in a wireless communication system operating at least according to IS-856 determines that a delay condition exists in the transmission of control packets to access terminals, it invokes interlacing of time slots bearing control-channel data. By so doing, control packets are transmitted in interlaced fashion, thereby reducing delay in transmission compared with sequential transmission of control packets. A delay condition could correspond to a measured delay exceeding a threshold delay, a predicted delay (e.g., based on queue occupancy) exceeding a threshold number, or the number of access terminals eligible to receive control messages during a particular time interval exceeding a different threshold number. The RAN may monitor transmission delay of control packets on a per-control-channel-cycle basis, and apply interlaced transmission of control packet only during those control-channel cycles for which a delay condition has been determined to exist.

22 Claims, 6 Drawing Sheets

FIG. 6

INTERLACED CONTROL CHANNEL

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

SUMMARY

Access terminals operating in a wireless communication system receive user data from a RAN on one or more "traffic channels," and receive control messages from a RAN on one or more "control channels." In accordance with some wireless interface protocols, for example under IS-856, the control channels and traffic channels are time division multiplexed together on common "forward" channels from the RAN to access terminals operating in a coverage area serviced by the RAN. Both traffic-channel data and control-channel data are assembled into packets, which are then subdivided and encoded into segments that are in turn scheduled for transmission in time slots of the forward channel. Time slots bearing traffic-channel data and time slots bearing control channel data are interlaced with one another on the forward channel to achieve time-division-multiplexed transmission.

While the time-slot scheduling of traffic-channel data and control-channel data is typically arranged to achieve high system throughput as well as low latency transmission, it may happen from time to time that one or more control messages is subject to unacceptable or problematic delay in transmission. Accordingly, embodiments of the present invention provide a method and system for reducing transmission delay of control messages by adjusting the scheduling of time slots to accommodate interlaced transmission of control-channel data associated with two or more control-data packets. More specifically, when a RAN determines that unacceptable or problematic delay exists, the RAN invokes interlacing of time slots bearing control-channel data of a plurality of control packets in place of sequential transmission of the plurality of control packets. Advantageously, this approach reduces delay in transmission of control messages.

Hence, in one respect, various embodiments of the present invention provide, in a wireless communication system that includes a Radio Access Network (RAN), a method of transmitting control messages to access terminals, the method being carried out by the RAN and comprising: on a radio frequency interface, transmitting, sequentially in time, control packets to access terminals, the control packets including a first and a second control packet, and each control packet being subdivided and transmitted as control-channel data in a sequence of periodic control-channel time slots that are interlaced with traffic-channel time slots bearing traffic-channel data; making a determination that a delay condition exists in transmission of at least one control packet; and in response to the determination, interlacing transmission of at least (i) control-channel data in a first sequence of control-channel time slots associated with the first control packet and (ii) control-channel data in a second sequence of control-channel time slots associated with the second control packet, by interlacing control-channel time slots of the first sequence with control-channel time slots of the second sequence.

In another respect, various embodiments of the present invention provide, in a wireless communication system that includes a Radio Access Network (RAN), and in which control messages are transmitted during repeating control-channel periods each comprising K consecutive control-channel cycles, each control-channel cycle spanning L time slots and recurring with a period of K control-channel cycles, wherein K≧1 and L≧1, a method of transmitting control messages to access terminals, the method being carried out by the RAN and comprising: scheduling transmission of control messages to a plurality of access terminals by making each access terminal of the plurality eligible to receive control messages during each periodic recurrence of at least one of the K consecutive control-channel cycles; on a radio frequency interface, during each control-channel cycle, transmitting control packets sequentially in time, the control packets including a first and a second control packet, and each control packet being subdivided and transmitted as control-channel data in a sequence of N control-channel time slots that are spaced every M time slots and are interlaced with traffic-channel time slots bearing traffic-channel data, wherein N≧1 and M≧2; making a determination that during a particular control-channel cycle a delay condition exists in transmission of at least one control packet; and in response to the determination, during the particular control-channel cycle, interlacing transmission of at least (i) control-channel data in a first sequence of control-channel time slots associated with the first control packet and (ii) control-channel data in a second sequence of control-channel time slots associated with the second control packet, by interlacing control-channel time slots of the first sequence with control-channel time slots of the second sequence.

In still another respect, various embodiments of the present invention provide, in a wireless communication system that includes a Radio Access Network (RAN), and in which control messages are transmitted during repeating control-channel periods each comprising K consecutive control-channel cycles, each control-channel cycle spanning L time slots and recurring with a period of K control-channel cycles, wherein K≧1 and L≧1, an improvement comprising: means for scheduling transmission of control messages to a plurality of access terminals by making each access terminal of the plurality eligible to receive control messages during each periodic recurrence of at least one of the K consecutive control-channel cycles; means for, on a radio frequency interface, during each control-channel cycle, transmitting control packets sequentially in time, wherein the control packets include a first and a second control packet, wherein each control packet is subdivided and transmitted as control-channel data in a sequence of N control-channel time slots that are spaced every M time slots and are interlaced with traffic-channel time slots bearing traffic-channel data, and wherein N≧1 and M≧2; means for making a determination that during a particular control-channel cycle a delay condition exists in transmission of at least one control packet; and means for, in response to the determination, during the particular control-channel cycle, interlacing transmission of at least (i) control-channel data in a first sequence of control-channel time slots associated with the first control packet and (ii) control-channel data in a second sequence of control-channel time slots associated with the second control packet, by means for interlacing control-channel time slots of the first sequence with control-channel time slots of the second sequence.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 6 illustrates a description of interlaced control channel operation in terms of time slot numbers and control-channel time slot indexes.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
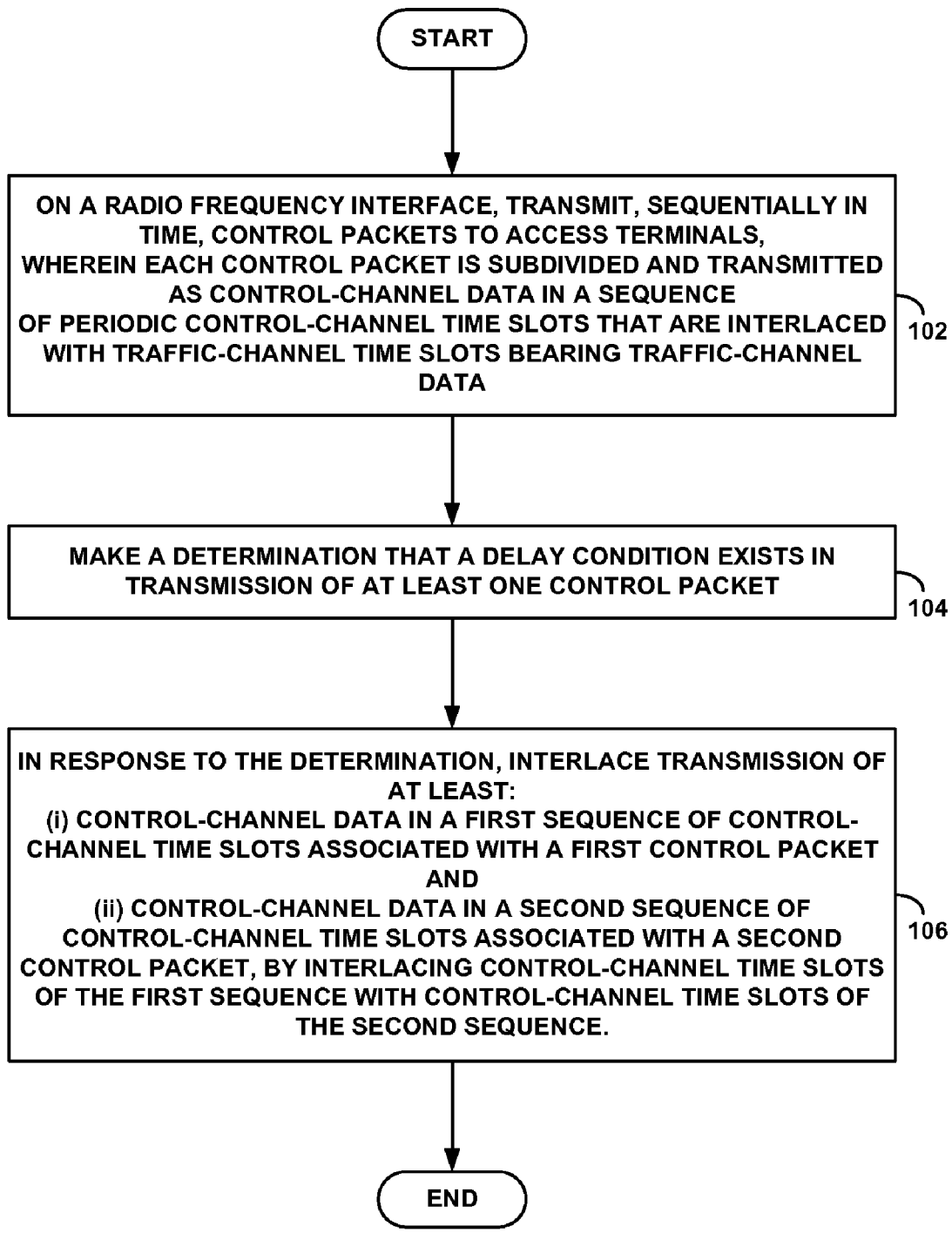
FIG. 1 is a flowchart depicting an example embodiment of interlaced control channel operation.

FIG. 1 is a flowchart depicting an example embodiment of interlaced control channel operation. By way of example, the steps of the flowchart could be implemented in a wireless communication system that operates according to a CDMA family of protocols, and in particular IS-856. At step 102 control packets are transmitted sequentially in time to access terminals, wherein each control packet is transmitted in a sequence of control-channel time slots that are interlaced with traffic-channel time slots. In accordance with the example embodiment, the control-channel time slots bear control-channel data, while the traffic-channel time slots bear traffic-channel data. In practice, each control packet comprises a partial, a whole, or more than one control message. Control messages in turn comprise messages containing system information that are broadcast to all ATs operating in a coverage area, and page messages that are transmitted to specific ATs.

While the control-channel time slots of any individual control packet are interlaced with traffic-channel time slots, each sequence of control-channel time slots is transmitted in its entirety before transmission of the next sequence begins.

Thus, each succeeding control packet is subject to a cumulative transmission delay of all the preceding control packets.

At step 104, the RAN makes a determination that a delay condition exists in the transmission of at least one control packet. By way of example, a delay condition could correspond to a measured delay in transmission that exceeds a threshold delay. Alternatively or additionally, a delay condition could correspond to a number of control packets in a transmission queue that exceeds a threshold number. As such, a delay condition based on queue occupancy can be considered a predicted delay. Yet a further alternative or additional basis of delay condition could correspond to a number of access terminals eligible to receive control messages during a particular time interval exceeding a threshold number. Other criteria for a delay condition, as well as how the existence of a delay condition is determined, are possible as well.

Finally, at step 106, in response to the determination made at step 104, control-channel time slots associated with a first control packet and control-channel time slots associated with a second control packet are interlaced, thereby resulting in interlaced transmission of the first and second control packets. Interlaced transmission advantageously leads to a reduction in the delay in transmission of the two control packet, when compared with sequential transmission. More generally, interlaced transmission can be extended to apply to more than two control packets, depending on the interlacing step size.

It will be appreciated that the steps of FIG. 1 are illustrated by way of example, and that additional and/or alternative steps or alternative ordering of steps could be carried in order to achieve interlaced control channel operation. Further details related to some of the steps shown in FIG. 1 are discussed below.

Figure 2:
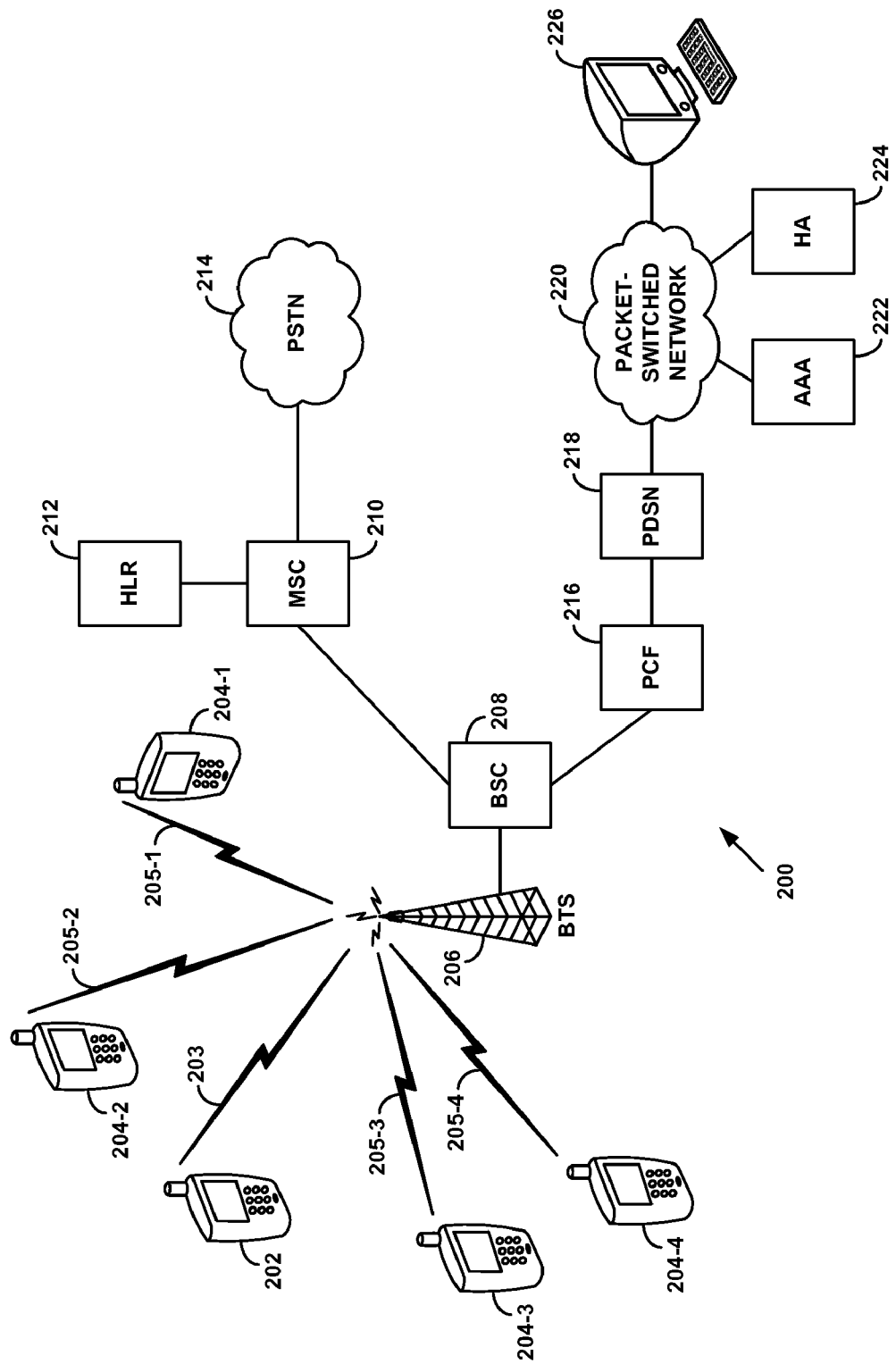
FIG. 2 is a simplified block diagram of a wireless communication system in which an example embodiment of interlaced control channel operation could be carried out.

FIG. 2 shows a simplified block diagram of a wireless communication system 200 in which an exemplary embodiment of interlaced control channel operation can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link"). Four other access terminals, AT 204-1, 204-2, 204-3, and 204-4, are also depicted in FIG. 2. As indicated, they communicate with BTS 206 over air interfaces 205-1, 205-2, 205-3, and 205-4, respectively. Each of these air interfaces is operationally similar to air interface 203, each representing at least a forward and reverse link. It will be appreciated that this arrangement is for purposes of illustration.

BSC 208 is connected to MSC 210, which acts to control assignment of air traffic channels (e.g., over air interfaces 203, 205-1, 205-2, 205-3, and 205-4), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 202, 204-1, 204-2, 204-3, and 204-4 typically comprises a user-interface, I/O components, a communication interface, a tone detector, a processing unit, and data storage, all of which may be coupled together by a system bus or other mechanism. As such, system 200, ATs 202, 204-1, 204-2, 204-3, and 204-4, and air interfaces 203, 205-1, 205-2, 205-3, and 205-4 collectively are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise EVDO control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

4. INTERLACING CONTROL-CHANNEL TIME SLOTS a. Sequential Transmission of Control Messages Under IS-856, a given access terminal receives EVDO control messages from the RAN on a control channel that is time-division multiplexed with traffic channels to individual ATs, as mentioned above, and described in further detail below. EVDO control messages include system information broadcast to all ATs having active data sessions, as well as page messages directed to specific ATs. Page messages are used to send information, alerts, and requests requiring responses. For instance, an AT is alerted of an incoming Voice over IP (VoIP) call or push-to-talk session via a page message. For purposes of the discussion herein, an EVDO control message carrying system information shall be referred to as an "EVDO control-channel message," while an EVDO control message carrying a page message shall be referred to as an "EVDO paging message." It may be possible for a single EVDO control message to carry both an EVDO control-channel message and an EVDO paging message. EVDO control messages will be referred to herein more generally as just "control messages."

In practice, the RAN transmits control messages to access terminals during periodically-recurring "12-cycle control-channel periods." Each 12-cycle control-channel period comprises 12 consecutive "EVDO control-channel cycles," such that any given one of the EVDO control-channel cycles recurs once every $12^{th}$ cycle. EVDO control-channel cycles will be referred to herein more generally as just "control-channel cycles." The RAN schedules transmission of control messages to occur in the periodic recurrences of each control-channel cycle. While access terminals may receive certain control messages during more than one control-channel cycle of a recurrence of the 12-cycle control-channel period, page messages for any given AT are sent only during an AT-specific one of the recurring control-channel cycles (and only if there is a page message to be sent to that AT). More particularly, a "hashing function" executed by the RAN or by each AT is used to assign each AT to a specific control-channel cycle within the recurring 12-cycle control-channel period. In turn, the AT then monitors each periodic recurrence of its assigned control-channel cycle for page messages. The hashing function effectively randomizes the assignments of ATs to the control-channel cycles such that, on average, no one cycle is assigned more ATs than any other cycle. In this sense, each AT is "eligible" to receive control messages at least during its assigned control-channel cycle, and possibly during other cycles as well.

Both control messages and user-specific data, such as email, VoIP media, push-to-talk messages, and other data and media services, are assembled into link-layer packets, which are then subdivided for transmission in time slots on the forward link. Packets bearing user-specific data are referred to herein as "traffic packets," and the data they carry are referred to herein as "traffic-channel data." Similarly, packets bearing control messages are referred to herein as "control packets," and the data they carry are referred to herein as "control-channel data." In EVDO communications (i.e., under IS-856), a control packet is an EVDO physical-layer control-data packet. As is known in the art, such a packet can contain a partial EVDO control message, a whole EVDO control message, or more than one EVDO control message. Traffic packets are subdivided for transmission in time slots designated herein as "traffic-channel time slots," while control packets are subdivided for transmission in time slots designated herein as "control-channel time slots." Note that these designations are used herein as a convenience in identifying the type of data carried in any given time slot, and that the formats of both designated types of time slots are otherwise the same.

The number of time slots required to transmit either a traffic packet or a control packet depends on the forward-link data rate and the encoding method used. For instance, a data rate of 38.4 kbps using QPSK encoding requires 16 time slots to transmit one packet. As another example, a data rate of 76.8 kbps using QPSK encoding requires eight time slots to transmit one packet. These two data and packetization rates apply to both control packets and traffic packets. Other, higher rates may also be used, but apply only to traffic packets. For example, a data rate of 1,228.8 kbps using 16-QAM encoding requires just two time slots to transmit one traffic packet. In the discussion herein of control packets, only 8-slot control packets (i.e., 76.8 kbps) will be considered, for purposes of illustration. However, it will be appreciated the methods and principles discussed herein are not limited to 8-slot control packets, and that 16-slot control packets, or even control packets of other lengths, remain within the scope and spirit of the present invention.

As described above, each forward-link time slot carries either traffic-channel data or control-channel data (in addition to the pilot and MAC channels). More specifically, forward-link transmissions are grouped in frames, each frame being 16 time slots in length, and every 16 frames comprising one control-channel cycle. Each control-channel cycle therefore contains 256 time slots. Since each time slot is 1.67 ms in duration, each control-channel cycle spans 426.67 ms, and each 12-cycle control-channel period spans 5.12 seconds. Put another way, each control-channel cycle recurs with a period of 5.12 seconds, so that a given AT monitors for page messages from the RAN every 5.12 seconds, when the AT's assigned control-channel cycle recurs. Note that scheduling of traffic packets is not generally tied to any particular control-channel cycle, so that traffic-channel time slots for a given AT can occur largely anywhere during a 12-cycle control-channel period (though possibly subject to other scheduling constraints).

Within each control-channel cycle, control-channel time slots and traffic-channel time slots are interlaced, such that every fourth time slot carries control-channel data, and the remaining, intervening three time slots carry traffic-channel data to one or more access terminals. Thus with this "4-slot interlacing," the eight time slots of each 8-slot control packet span 32 time slots within a control-channel cycle, and a total of eight 8-slot control packets can be transmitted during any given control-channel cycle, leaving 192 time slots for traffic-channel data (i.e., traffic-channel time slots).

Figure 3:
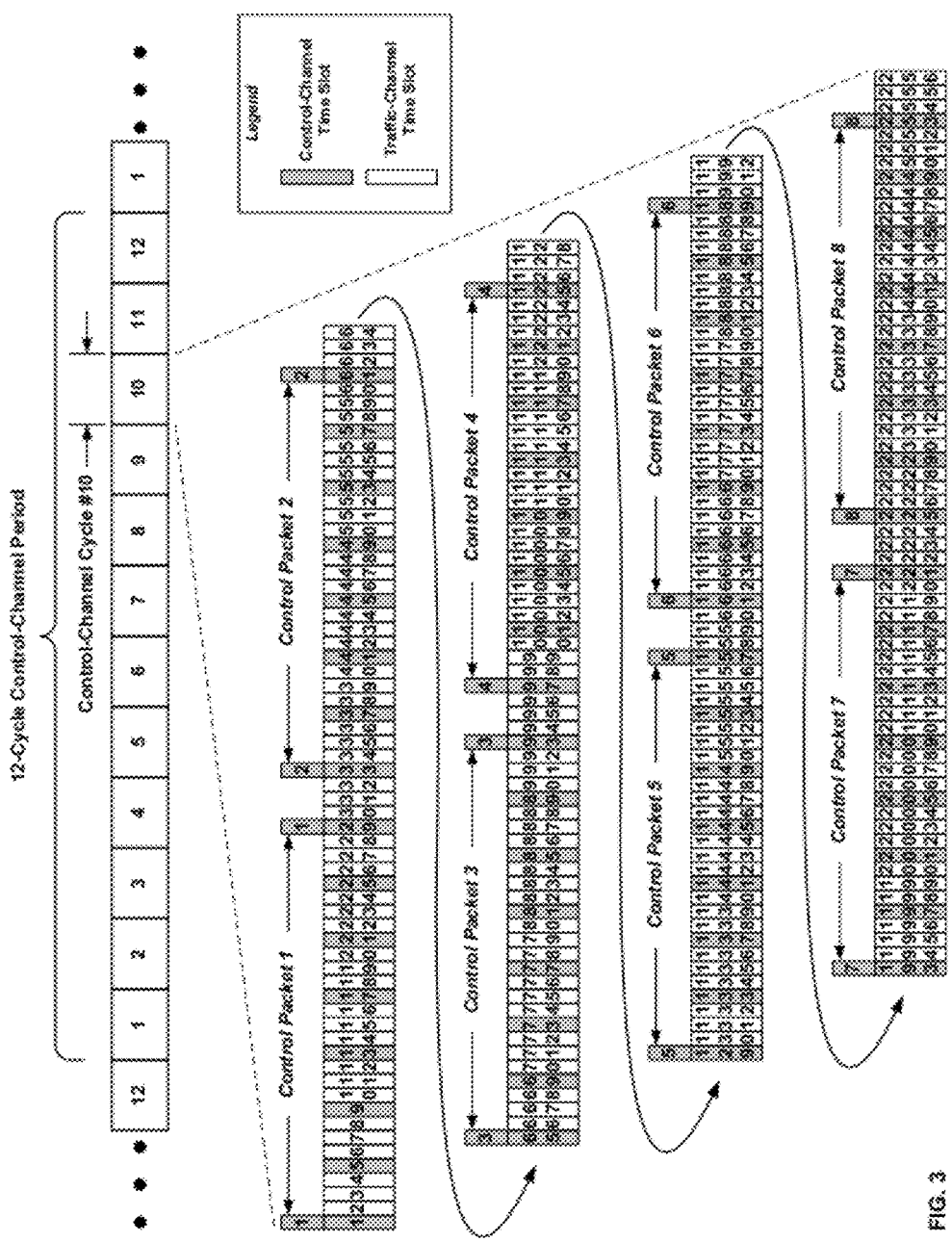
FIG. 3 illustrates the operational principles of conventional control channel operation.

FIG. 3 illustrates the arrangement of time slots in control-channel cycles described above. At the top of the figure, a 12-cycle control-channel period is depicted with control-channel cycles numbered 1, 2, 3, . . . , 12. Also shown are the last cycle (#12) of the immediately preceding period and the first cycle (#1) of the immediately following period. These last and first control-channel cycles (as well as leading and trailing ellipses) are meant to represent the periodic recurrence of the 12-cycle control-channel periods.

The organization of time slots is shown below the 12-cycle control-channel period, with control-channel cycle #10 taken as an example. The following discussion could apply to any of the other control-channel cycles as well. Cycle #10 is magnified to show all 256 time slots, and in order to fit on one page, the magnified view is broken into four segments: time slots {1-64}, {65-128}, {129-192}, and {193-256}; s-shaped arrows indicate the contiguity between the segments. Dashed lines connect the start and end of the cycle in the top view with the extent of the cycle in the magnified view. The time slots in the magnified view are numbered 1, 2, 3, . . . , 256, and as indicated by the "Legend" at the right of the figure, control-channel time slots are shown in gray, while traffic-channel time slots are shown in white.

In the present illustration, the first control packet, labeled "Control Packet 1," occupies every fourth time slot, beginning with time slot 1 and ending with time slot 29; i.e., the gray time slots numbered 1, 5, 9, 13, 17, 21, 25, and 29. As shown, the intervening white time slots are traffic-channel time slots. Gray blocks labeled "1" are shown above each of time slot 1 and time slot 29 to illustrate the extent of the first control packet. With 4-slot interlacing, the second control packet, labeled "Control Packet 2," begins at time slot 33 (i.e., after a delay of three traffic time slots), and occupies every fourth time slot up to and including time slot 61. Again, the intervening white time slots are traffic-channel time slots. And similarly to Control Packet 1, gray blocks labeled "2" are placed above each of time slot 33 and time slot 61 to illustrate the extent of the second control packet. A similar arrangement of time slots is shown for the remaining control packets, labeled "Control Packet 3," "Control Packet 4," "Control Packet 5," "Control Packet 6," "Control Packet 7," and "Control Packet 8." As shown, there are three traffic-channel time slots between each of these control packets (and prior to Control Packet 3).

b. Operational Principles of Interlaced Control Channel Transmission

According to conventional operation described above, during any given control-channel cycle, the RAN schedules and transmits a plurality of control packets sequentially, each in its entirety, one after another. As illustrated in FIG. 3, with 4-slot interlacing applied to eight sequential control packets, transmission of the second control packet doesn't begin until time slot 33 and doesn't complete until time slot 61; transmission of the third control packet doesn't begin until time slot 65 and doesn't complete until time slot 93; and so on. Consequently, the later-transmitted of a plurality of control packets are subject to cumulative delays in multiples of 32 time slots, or multiples of 53.3 ms. Note that this sequential transmission applies even if fewer than eight control packets are transmitted during one control-channel cycle.

It may occur from time to time that this delay or latency experienced in transmission of a plurality control packets is problematic. For instance, if a page message associated with a delay-sensitive application (such as Push-to-talk) needs to be sent to an AT, and there are several (up to seven) control packets queued ahead of the page message, then the page won't be transmitted until roughly 373 ms after the start of the control-channel cycle for the AT (i.e., after the transmission of Control Packet 7 plus three traffic-channel time slots, or a total of 224 time slots). This delay will be added to any time between the arrival of the page message at the RAN and the next available control-channel cycle for the target AT. Other circumstances where delay can become an issue may occur as well.

In accordance with an example embodiment of control channel interlacing, the RAN can determine if and when delay in transmission of control packets becomes unacceptable or problematic, and responsively begin scheduling transmission of the control-channel time slots of successive control packets in interlaced fashion. This may be done by displacing some interlaced traffic-channel time slots to a later time, and interlacing control-channel time slots in place of the displaced traffic-channel time slots. By so doing, the RAN can advantageously reduce the delay in transmission of control packets. More specifically, the RAN can make the delay determination and take any appropriate remedial action on a per-control-channel-cycle basis. Thus, the RAN may use control channel interlacing for some control-channel cycles, but not others. While interlacing the control-channel time slots of different control packets may be accomplished at the expense of otherwise interlaced traffic-channel time slots, by carrying out the method on a per-control-channel-cycle basis, the net number of traffic-channel time slots in any given control-channel cycle is not reduced. Hence, there is no net reduction in the allocation of time slots to traffic-channel data within any give control-channel cycle, only a possible rescheduling within the cycle.

Figure 4:
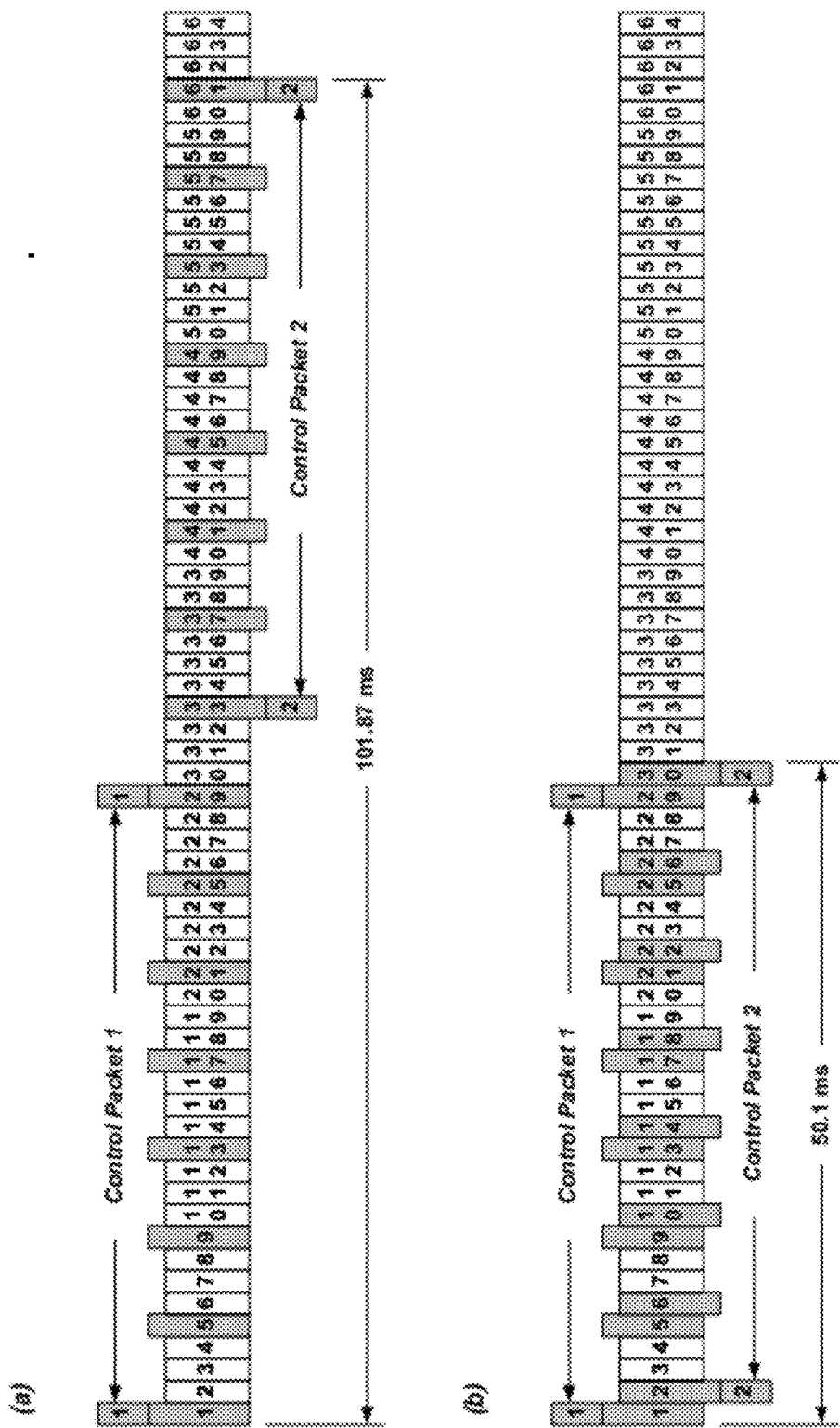
FIG. 4 illustrates the operational principles of interlaced control channel operation as applied to two control packets.

The operational principles of interlaced control channel are illustrated in FIG. 4 by way of example for just two control channel packets: "Control Packet 1" and "Control Packet 2." As in FIG. 3, control-channel time slots are shown in gray and traffic-channel time slots are shown in white. Further, as an aid to visually distinguishing interlaced time slots of the two control packets, the time slots of Control Packet 1 are depicted as extending slightly above to other time slots, while the time slots of Control Packet 2 are depicted as extending slightly below to other time slots. These extensions are diagrammatic, and do not signify any physical or format differences between time slots.

The top panel of FIG. 4 (labeled "(a)") shows the arrangement of time slots for sequential transmission of the two control packets. Control Packet 1 occupies eight time slots that span from time slot 1 through time slot 29, with 4-slot interlacing. After a delay of three traffic-channel time slots, Control Packet 2 occupies eight time slots that span from time slot 33 through time slot 61. The total time required to transmit both packets is 101.87 ms (61 time slots), as indicated.

An example of control channel interlacing is illustrated in the bottom panel of FIG. 4 (labeled "(b)"). According the example embodiment, Control Packet 1 occupies the same eight time slots as in the top of the figure. However, Control Packet 2 is now interlaced with Control Packet 1 so that every time slot of Control Packet 1 is immediately followed by a time slot of Control Packet 2. Thus, time slot 1 is the first time slot of Control Packet 1, time slot 2 is the first time slot of Control Packet 2, time slot 5 is the second time slot of Control Packet 1, time slot 6 is the second time slot of Control Packet 2, and so on. Finally, the eighth (last) time slot of Control Packet 2 occurs in time slot 30. The total time required to transmit both packets is now 50.1 ms, advantageously a reduction by more than a factor of two. Note that in the span of 64 time slots shown in FIG. 4, there has been no reduction in the number of traffic-channel time slots, just a displacement in time.

Figure 5:
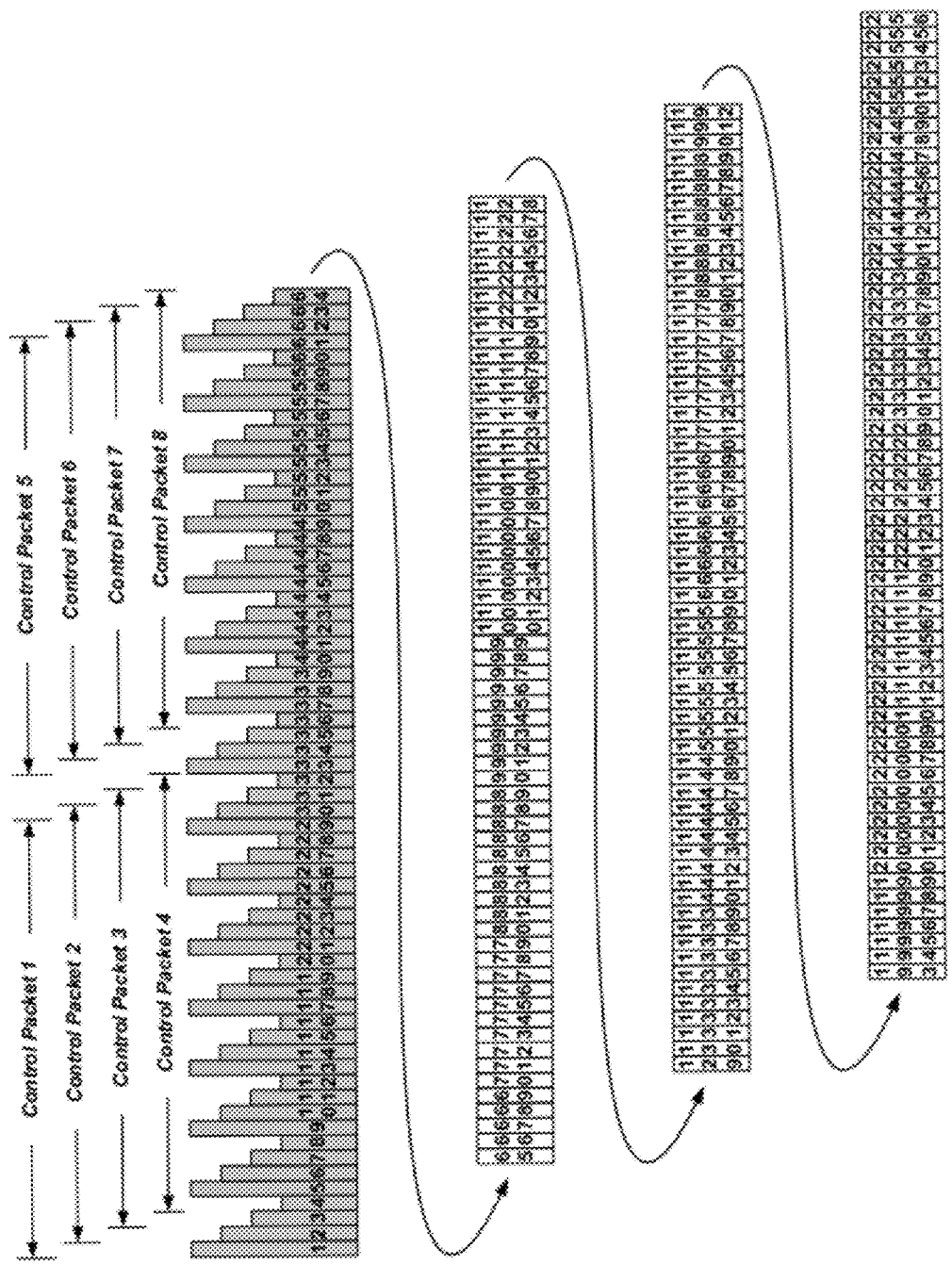
FIG. 5 illustrates the operational principles of interlaced control channel operation as applied to eight control packets.

FIG. 5 illustrates interlacing of eight control packets within a control-channel cycle. As in FIG. 3, the 256 time slots of the control-channel cycle are shown in a magnified view, broken into four segments. All of the first 64 time slots are devoted to the eight interlaced control-channel time slots, while the remaining 192 are devoted to traffic-channel time slots. Since 4-slot interlacing enables interlacing of at most four packets, the most compact format for interlacing eight control packets is in two sets of 4-slot interlacing, one set after the other. This is the format illustrated in FIG. 5. As an aid to visually distinguishing interlaced time slots of the eight control packets, the time slots of the four distinct control packets of each of the two sets are shown with different heights, from tallest (Control Packet 1, first set; Control Packet 5, second set) to shortest (Control Packet 4, first set; Control Packet 8, second set). As with FIG. 4, the differing packet heights are diagrammatic, and do not signify any physical or format differences between time slots.

As FIG. 5 illustrates, Control Packets 1-4 occupy time slots 1 through 32 in interlaced fashion, while Control Packets 5-8 occupy time slots 33 through 64, also in interlaced fashion. In the arrangement, there is no delay between the last time slot of Control Packet 4 and the first time slot of Control Packet 5. If sequential transmission had been used, the total time to transmit eight control packets would be 421.67 ms. However, using 4-slot control channel interlacing with the first and second sets of four control packets results in a total transmission time of 106.67 ms. Thus, in this case control channel interlacing advantageously yields a reduction in delay of 315 ms, or nearly a factor of four.

Figure 6:
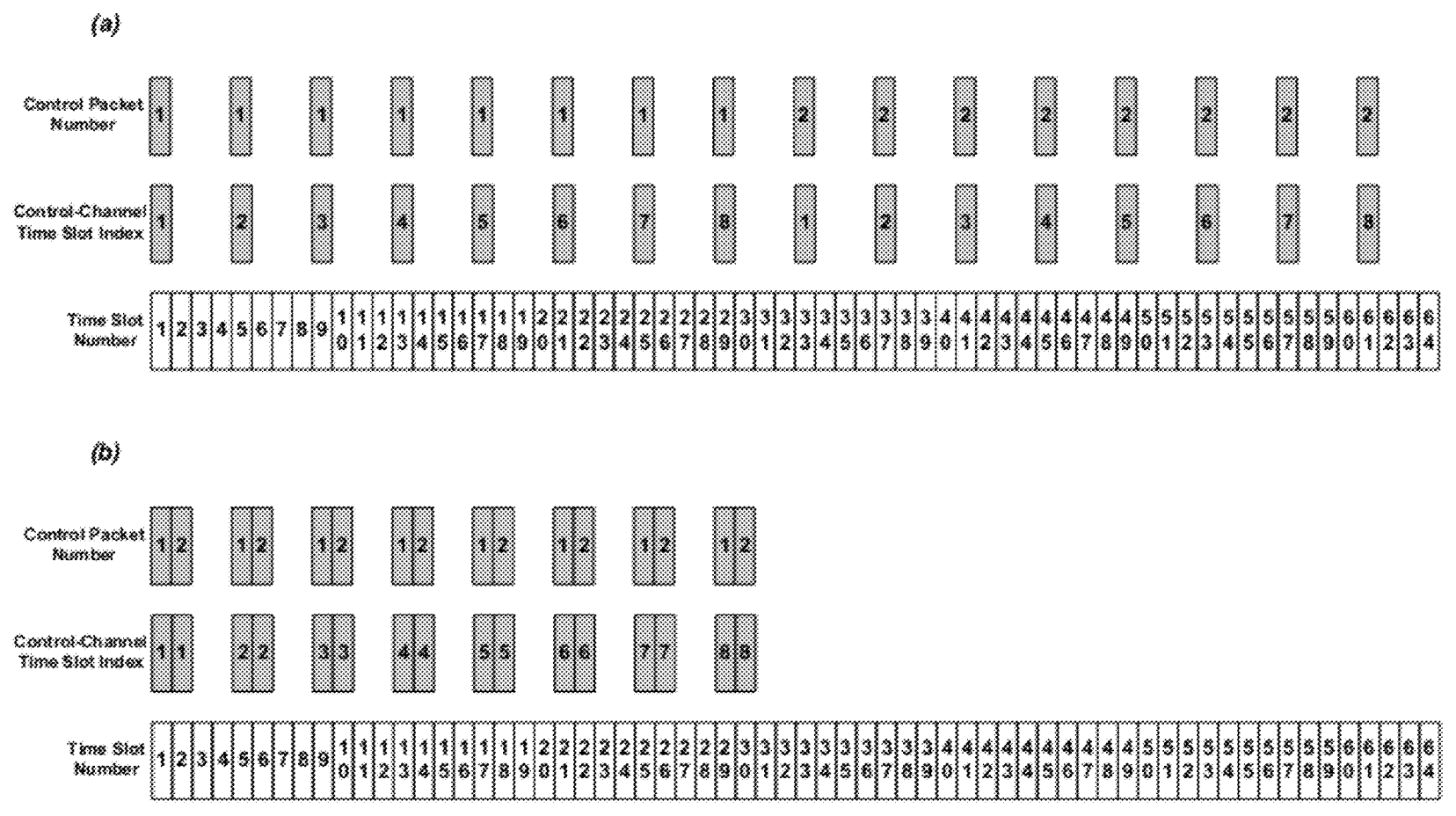

FIG. 6 provides an alternate view of control channel interlacing, again just for the case of two control packets, as previously illustrated in FIG. 3. The purpose of FIG. 6 is not to describe a different mode of operation, but rather to provide a description that relates time slot numbers of a control-channel cycle to control-channel "time slot indexes" associated with the time slots of a control packet. The time slots associated with a given control packet comprise a sequence of control-channel time slots, wherein the sequence is indexed from I=1 to N in increments of 1. Each index of the sequence is referred to herein as a "time slot index." For instance, for 8-slot control packets, N=8, and the time slot indexes are I={1, 2, 3, 4, 5, 6, 7, 8}. The association of a time slot index with a time slot number specifies the position of the $I^{th}$ control-channel time slot within the sequence of numbered time slots. This association essentially reflects scheduling by the RAN of the $I^{th}$ control-channel time slot in a particular time slot of the control-channel cycle.

The top panel of FIG. 6 (labeled "(a)") shows sequential transmission of Control Packet 1 and Control Packet 2. The first 64 time slots of a control-channel cycle are represented at the bottom of the top panel as sequence of numbers from 1 through 64. At the top of the top panel, a first sequence of eight gray slot-shaped boxes, each labeled "1," followed by a second sequence of eight gray slot-shaped boxes, each labeled "2," identifies time slots occupied by either Control Packet 1 or Control Packet 2, respectively. The time slot indexes of the two control packets are show in the middle, between the control packet numbers and the time slot numbers. With 4-slot interlacing, Control Packet 1 time slots with indexes {1, 2, 3, 4, 5, 6, 7, 8} are scheduled in time slots {1, 5, 9, 13, 17, 21, 25, 29}, while Control Packet 2 time slots with indexes {1, 2, 3, 4, 5, 6, 7, 8} are scheduled in time slots {33, 37, 41, 45, 49, 53, 57, 61}.

The bottom panel of FIG. 6 (labeled "(b)") shows interlaced transmission of Control Packet 1 and Control Packet 2. As shown in the top of the bottom panel, the control packet numbers "1" and "2" alternate. In the middle, the corresponding indexes of each control packet are grouped in pairs, indicating that correspondingly-indexed control-channel time slots of the two control packets are scheduled in adjacent time slots. For example, index 1 of both control packets are scheduled in time slots 1 and 2; index 2 of both control packets are scheduled in time slots 5 and 6; and so on. This description can be extended to any number of control packets up to the interlacing step size (e.g., 4-slot interlacing).

The principles illustrated above for the case of 256-slot control-channel cycles with 4-slot interlacing can be generalized by defining control-channel size, interlacing step size, and packet size in terms of integer variables. Specifically, let K be the number of control-channel cycles in one control-channel period, and let L be the number of time slots in each control-channel cycle. Further, let M be the interlacing step size and let N be the number of time slots in each control packet, wherein $N \geq 1$ and $M \geq 2$. Then each control packet spans $(N-1) \times M+1$ time slots in a control-channel cycle. With sequential transmission of control packets, there are M−1 traffic-channel time slots between last time slot of one control packet and the first time slot of the next control (and between each time slot of a given control packet).

Using control channel interlacing, J control packets can be interlaced, wherein $2 \leq J \leq M$. The total time required to transmit all J control packets is reduced by $(J-1) \times [(N \times M)-1]$ time slots compared with the total time using sequential transmission of the J control packets. This corresponds to a reduction in delay or latency in the transmission of control packets.

In accordance with IS-856, as described above, K=12, L=256, N=8, and M=4. It will be appreciated that other values for these integer variables could be used, and still remain within the scope and spirit of the present invention.

5. EXAMPLE EMBODIMENT OF INTERLACED CONTROL CHANNEL

The operational principles of control channel interlacing described above, as well as implementation of methods and means according to those principles, comprise elements of an example embodiment. Additional elements of the example embodiment include methods and means of determining when and under what conditions interlacing of control-channel time slots is invoked. The conditions that will cause the RAN to use interlacing of control-channel time slots are referred to herein generally as a "delay condition."

In accordance with the example embodiment, a delay condition is one indicating unacceptable or problematic delay in the transmission of control packets to access terminals. In practice, the RAN can determine whether a delay condition exists according to one or more metrics, including measured delay in transmission of one or more control packets, number of control packets in queue and awaiting transmission from the RAN to access terminals, and number of access terminals eligible to receive control messages from the RAN within a particular time interval. More specifically, a value or characteristic of one or more of these metrics could be determined via measurement and/or prediction, and the determined value or characteristic may then be compared with a threshold value or characteristic in order to determine if a delay condition exists.

In practice, the measurement and/or prediction, as well as the threshold comparison, could be made during a current recurrence of a particular control-channel cycle, or during a previous periodic recurrence of the particular control-channel cycle. Further, control channel interlacing could be invoked during a current control-channel cycle, or during a subsequent periodic recurrence of the cycle. For instance, a determination of a delay condition made during a current recurrence of control-channel cycle #10 could be used to invoke control channel interlacing during the current or the next (or other subsequent) recurrence of control-channel cycle #10. Note that a delay condition could also exist for one or more of the other control-channel cycles besides cycle #10, while some cycles might not be experiencing a delay condition.

Each metric is discussed in more detail below, followed by a description of an example embodiment of interlaced control channel operation. It will be appreciated that various actions and steps described below could be carried out by the RAN or one or more computing platforms associated with the RAN. The computing platform (or platforms) could include one or more forms of computer memory (e.g., disk, RAM, etc.), as well as one or more general and/or special purpose processors. Further, the described methods could be implemented as program logic stored in the computer memory as software, firmware, or some other form of stored machine-language instructions, and executed by the one or more general and/or special purpose processors. As described above, the RAN will also include communication interfaces for sending and receiving communications to various other elements and entities of a wireless communication system.

a. Measured Delay

The delay in transmission of a control packet may be measured by the RAN as the time between the arrival of the packet at the RAN and the transmission of the control packet to one or more access terminals. Arrival could itself be marked by the actual reception at the RAN of a packetized control message from a network entity in the wireless communication network, or the placement of a packet into a transmission queue at the RAN. Transmission of the packet could be marked by transmission of the first or last control-channel time slot associated with the packet. Other methods of measuring transmission delay of individual control packets could be devised as well.

The RAN could compare individual delays to a threshold delay to determine if any one of them is problematic. Further, the RAN could monitor transmission delay of all control packets, or only those control packets that are associated with delay-sensitive applications, such as a page message for push-to-talk of a VoIP session. For example, the RAN could recognize that a particular control packet includes a page to an AT, and that the page message is associated with a delay sensitive application on the AT. Additionally, the value of threshold delay could depend on the type of packet begin considered. For instance, when monitoring delay of packets associated with a delay-sensitive application, the RAN might use a shorter threshold than when monitoring delay for other packets. By way of example, the threshold delay could be in a range of 0.25 seconds to 5 seconds, the lower end corresponding to a timescale similar to that of a control-channel cycle, and the upper end corresponding to an approximate timescale of a 12-cycle control-channel period. It will be appreciated that other values of threshold could be used as well.

In accordance with the example embodiment, the RAN could determine that a delay exceeds the threshold during a current recurrence of a particular control-channel cycle, and then invoke control channel interlacing during the current recurrence of particular cycle, or during a subsequent periodic recurrence of the particular cycle.

b. Predicted Delay

Measuring delay during one periodic recurrence of a control-channel cycle to determine whether or not to invoke control channel interlacing during a subsequent recurrence of the cycle could be considered one method of prediction. Another method of predicting delay could be to track the number of control packets in queue awaiting transmission. It will be appreciated that queuing theory provides various forms of analytic expressions of delay through a queue based on queue length, queue discipline (e.g., first-in-first-out, priorities), and processing delay (e.g., random or deterministic processing times), among other possible factors. The RAN could implement one or more transmission queues in its memory (e.g., RAM, disk, etc.), and execute program logic that applies analytic or numerical algorithms to the queue properties (e.g., number of control messages in the queues, processing times, etc.) to predict delay. As one example, the RAN could predict that transmission delay will exceed a threshold if the number of control packets in a queue awaiting transmission exceeds a threshold number. Then if the number of packets in queue exceeded the threshold number (and, correspondingly, the predicted delay in transmission of control packets exceeds a threshold delay), the RAN could invoke control channel interlacing. Other, more complicated and/or sophisticated calculations of predicted queuing delay could be implemented at the RAN as well.

As with measuring delay, the RAN could make a prediction during a current periodic recurrence of a control-channel cycle, and invoke control channel interlacing during the current or the next (or other subsequent) periodic recurrence of the cycle. Additionally, the prediction method could be applied to all control packets, or only to those associated with delay-sensitive applications or missions (i.e., the purpose of the message carried in the packet).

c. Number of Eligible Access Terminals

As described above, a given access terminal is eligible to receive control messages at least during the control-channel cycle to which it is assigned. Specifically, the given AT monitors for page messages during its assigned control-channel cycle. A hashing function is used to determine the assignment of ATs to control-channel cycles, so as to approximately evenly distribute the ATs among the 12 cycles. However, it may happen from time to time that one or more control-channel cycles has a disproportionately large number of ATs assigned to it. Or, among an otherwise even distribution, one or more cycles may each have a large number of ATs running applications associated with delay-sensitive control messages (e.g., pages). In these or other possible cases, control messages transmitted (or queued for transmission) during these one or more control-channel cycles may be subject to unacceptable or problematic delay. This, in turn, could constitute a delay condition, and the RAN could invoke control channel interlacing in response to determining existence of the condition.

As with the other two methods of determining the existence of a delay condition, the determination that greater than a threshold number of access terminals is eligible to receive control packets during a particular control-channel cycle could be made during a current periodic recurrence of the particular control-channel cycle, while control channel interlacing could be responsively invoked during the current or the next (or other subsequent) periodic recurrence of the particular cycle. Additionally, this method could be applied to all control packets, or only to those associated with delay-sensitive applications or missions (i.e., the purpose of the message carried in the packet).

d. Example Operation of Control Channel Interlacing.

In accordance with the example embodiment, a RAN will invoke interlacing of control-channel time slots associated with different control packets upon a determination that a delay condition exists. Some or all of the above methods could be used to determine the existence of a delay condition. Other methods and criteria could be used as well.

The RAN will monitor transmission delay during each recurrent control-channel cycle, and invoke interlacing only for those recurrent cycles for which a delay condition is determined to exist. When the RAN determines that a delay condition exists for a given control-channel cycle (e.g., cycle #10), it can begin scheduling transmission in control-channel time slots according to the operational principles described above. Taking 4-slot interlacing and eight control packets as an example, the RAN could schedule all eight control packets in the first 64 time slots of the given control-channel cycle, in a manner illustrated in FIG. 5, for instance. In this example, the RAN can reduce the delay in transmitting all eight packets by nearly a factor of four, as described above. Other amounts of delay reduction could be achieved as well.

In practice, the RAN schedules transmission of EVDO control-channel data and EVDO traffic-channel data through the actions of a time slot scheduler, which may take various forms. Conceptually, the scheduler may implement 4-slot interlacing by queuing packets in one of a plurality of transmit queues. When a given packet reaches the head of a queue, it is subdivided and encoded into segments, each segment corresponding to a time duration of one time slot. That is, each segment can be transmitted over a duration of one time slot. The number of segments per packet, and hence the number of time slots required for transmission of the packet, depends on the data rate and encoding method. As described above, control packets are subdivided into eight segments for transmission during eight time slots (assuming 76.8 kbps and QPSK encoding).

At any given instant, the next segment to be transmitted is selected by the time slot scheduler from the head (i.e., the output) one of the queues, such that when the next time slot begins, the selected segment is transmitted. The time slot scheduler selects among the queues in an order that results in interlaced transmission. For example, 4-slot interlacing of traffic-channel time slots with control-channel time slots during a given control-channel cycle, as illustrated above in FIG. 3, could be achieved with two sets of queues: one for traffic packets and one for control packets (e.g., Control Packet 1, Control Packet 2, . . . , Control Packet 8). The time slot scheduler could first select a segment from the control-packet queue holding Control Packet 1, then select the next three segments from some combination of traffic-packet queues, then return again to the control-packet queue holding Control Packet 1, and so on. After all eight segments of Control Packet 1 are transmitted (with three traffic-channel segments between each control-channel segment), the scheduler can then select from the control-packet queue holding Control Packet 2, thereby continuing to interlace with traffic channel segments from the traffic channel queues.

In accordance with the example embodiment, upon a determination that a delay condition exists, the scheduler could revise the order in which it selects from the queues, such that only control-channel segments are interlaced for some portion of a control-channel cycle. For instance, the control channel interlacing illustrated above in FIG. 5 could be achieved by selecting only from the control channel queues for the first 64 time slots of a control-channel cycle, then selecting only from the traffic-channel queues for the remaining 192 time slots. More specifically, the scheduler could select among control-channel queues in an order that interlaces control-channel time slots according to the sequence illustrated in the first 64 time slots depicted in FIG. 5.

In further accordance with the example embodiment, the time slot scheduler could apply control channel interlacing to all control packets in queue awaiting transmission, or possibly only to those associated with time-sensitive or time-critical applications. Moreover, the time slot scheduler could invoke control channel interlacing only during those control-channel cycles for which a delay condition has been determined to exist. Conventional interlacing of control-channel time slots with traffic-channel time slots could remain in place for other control-channel cycles.

Finally, control channel interlacing for any given control-channel cycle could be invoked on a temporary basis. That is, since control channel interlacing advantageously reduces delay in transmission of control packets, it may be anticipated that a delay condition that triggered the RAN to invoke control channel interlacing will be remedied after some time, as a result of the reduced delay. The RAN may therefore detect when the delay condition no longer exists, and responsively revert back to conventional interlacing of traffic-channel time slots with control-channel time slots.

In accordance with the example embodiment, the queues could be implemented in some form of memory in the RAN, while the logic for selection order could be implemented in machine-language instructions, in a manner described above. Further, it will be appreciated that the description herein of queues and selection processes may represent a simplification of an implementation that might be achieved in practice, and that certain details have been omitted for the sake of brevity. Moreover, other implementations are possible as well, and the one describe herein should not be viewed as limiting with respect to the present invention.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a wireless communication system that includes a Radio Access Network (RAN), a method of transmitting control messages to access terminals, the method being carried out by the RAN and comprising:

on a radio frequency interface, transmitting, sequentially in time, control packets to access terminals, the control packets including a first and a second control packet, and each control packet being subdivided and transmitted as control-channel data in a sequence of periodic control-channel time slots that are interlaced with traffic-channel time slots bearing traffic-channel data;

making a determination that a delay condition exists in transmission of at least one control packet; and in response to the determination, interlacing transmission of at least (i) control-channel data in a first sequence of control-channel time slots associated with the first control packet and (ii) control-channel data in a second sequence of control-channel time slots associated with the second control packet, by interlacing control-channel time slots of the first sequence with control-channel time slots of the second sequence, wherein the first and second sequence of control-channel time slots is each ordered from a first time slot to a last time slot, and wherein interlacing control-channel time slots of the first sequence with control-channel time slots of the second sequence comprises:

scheduling the first time slot of the second sequence immediately following the first time slot of the first sequence; and scheduling the last time slot of the second sequence no later than immediately following the last time slot of the first sequence.

2. The method of claim 1, wherein the wireless communication system operates according to a CDMA family of protocols, and wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message.

3. The method of claim 1, wherein making the determination that the delay condition exists in transmission of the at least one control packet comprises measuring a delay in transmission of one or more control packets that exceeds a threshold delay.

4. The method of claim 1, wherein making the determination that the delay condition exists in transmission of the at least one control packet comprises predicting that a delay in transmission of one or more control packets will exceed a threshold delay.

5. The method of claim 4, wherein predicting that the delay in transmission of one or more control packets will exceed a threshold delay comprises determining that at least a threshold number of control packets are in queue and awaiting transmission from the RAN to access terminals.

6. The method of claim 1, wherein making the determination that the delay condition exists in transmission of the at least one control packet comprises determining that a threshold number of access terminals are eligible for receiving control messages from the RAN within a particular time interval.

7. The method of claim 6, wherein the wireless communication system operates according to a CDMA family of protocols, wherein the particular time interval is an EVDO control-channel cycle, and wherein determining that the threshold number of access terminals are eligible for receiving control messages from the RAN within a particular time interval comprises determining that the threshold number of access terminals have hashed to a particular, periodically-recurring EVDO control-channel cycle during which they monitor for respective page messages.

8. In a wireless communication system that includes a Radio Access Network (RAN), a method of transmitting control messages to access terminals, the method being carried out by the RAN and comprising:

on a radio frequency interface, transmitting, sequentially in time, control packets to access terminals, the control packets including a first and a second control packet, and each control packet being subdivided and transmitted as control-channel data in a sequence of periodic control-channel time slots that are interlaced with traffic-channel time slots bearing traffic-channel data making a determination that a delay condition exists in transmission of at least one control packet; and in response to the determination, interlacing transmission of at least (i) control-channel data in a first sequence of control-channel time slots associated with the first control packet and (ii) control-channel data in a second sequence of control-channel time slots associated with the second control packet, by interlacing control-channel time slots of the first sequence with control-channel time slots of the second sequence, wherein the first and second sequence of control-channel time slots each contains N control-channel time slots indexed in increments of 1 from 1 to N, the N control-channel time slots of each sequence being periodically spaced every M time slots, thereby yielding a total time duration of each sequence of (N−1)×M+1 time slots, wherein $N \geq 1$ and $M \geq 2$, and wherein interlacing control-channel time slots of the first sequence with control-channel time slots of the second sequence comprises scheduling each control-channel time slot of the second sequence immediately following a correspondingly-indexed control-channel time slot of the first sequence, thereby reducing a total delay in transmission of the first and second control packets by (N×M)−1 time slots compared with a total delay resulting from transmitting the first control packet in its entirety followed by transmitting the second control packet in its entirety, with an inter-packet delay of M−1 time slots in between the first and second control packet.

9. The method of claim 8, further comprising interlacing up to M−2 additional sequences of control-channel time slots, each of the additional sequences containing N control-channel time slots indexed in increments of 1 from 1 to N, the N control-channel time slots of each of the additional sequences being periodically spaced every M time slots thereby yielding a total time duration of each of the additional sequences of (N−1)×M+1 time slots, and each of the additional sequences bearing control-channel data respectively associated with one of up to M−2 additional control packets, whereby there is a total of J control packets in J respective sequences of control-channel time slots, including the first and second control packets in the first and second sequences, wherein $2 \geq J \geq M$, and wherein correspondingly-indexed control-channel time slots of each of the J respective sequences are scheduled one after another, thereby reducing a total delay in transmission of the J control packets by (J−1)×[(N×M)−1] time slots compared with a total delay resulting from sequentially transmitting each of the J control packets in its entirety with an inter-packet delay of M−1 time slots between each of the J control packets.

10. In a wireless communication system that includes a Radio Access Network (RAN), and in which control messages are transmitted during repeating control-channel periods each comprising K consecutive control-channel cycles, each control-channel cycle spanning L time slots and recurring with a period of K control-channel cycles, wherein $K \geq 1$ and $L \geq 1$, a method of transmitting control messages to access terminals, the method being carried out by the RAN and comprising:

scheduling transmission of control messages to a plurality of access terminals by making each access terminal of the plurality eligible to receive control messages during each periodic recurrence of at least one of the K consecutive control-channel cycles;

on a radio frequency interface, during each control-channel cycle, transmitting control packets sequentially in time, the control packets including a first and a second control packet, and each control packet being subdivided and transmitted as control-channel data in a sequence of N control-channel time slots that are spaced every M time slots and are interlaced with traffic-channel time slots bearing traffic-channel data, wherein $N \geq 1$ and $M \geq 2$;

making a determination that during a particular control-channel cycle a delay condition exists in transmission of at least one control packet; and in response to the determination, during the particular control-channel cycle, interlacing transmission of at least (i) control-channel data in a first sequence of control-channel time slots associated with the first control packet and (ii) control-channel data in a second sequence of control-channel time slots associated with the second control packet, by interlacing control-channel time slots of the first sequence with control-channel time slots of the second sequence, wherein the N control-channel time slots of each of the first and second sequence of control-channel time slots are indexed in increments of 1 from 1 to N, wherein each of the first and second sequence of control-channel time slots has a total time duration of $(N-1) \times M+1$ time slots, and wherein interlacing control-channel time slots of the first sequence with control-channel time slots of the second sequence comprises scheduling each control-channel time slot of the second sequence immediately following a correspondingly-indexed control-channel time slot of the first sequence, thereby reducing a total delay in transmission of the first and second control packets by $(N \times M)-1$ time slots compared with a total delay resulting from transmitting the first control packet in its entirety followed by transmitting the second control packet in its entirety, with an inter-packet delay of $M-1$ time slots in between the first and second control packet.

11. The method of claim 10, wherein the wireless communication system operates according to a CDMA family of protocols, wherein K=12, L=256, N=8, and M=4, wherein the control-channel period is a 12-cycle EVDO control-channel period, and wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message.

12. The method of claim 10, wherein making the determination that during the particular control-channel cycle the delay condition exists in transmission of the at least one control packet comprises measuring a delay in transmission of one or more control packets that exceeds a threshold delay, wherein the delay is measured during an interval selected from the group consisting of the particular control-channel cycle, and a previous periodic recurrence of the particular control-channel cycle.

13. The method of claim 10, wherein making the determination that during the particular control-channel cycle the delay condition exists in transmission of the at least one control packet comprises making a prediction that during the particular control-channel cycle a delay in transmission of one or more control packets will exceed a threshold delay, wherein the prediction is made during an interval selected from the group consisting of the particular control-channel cycle, and a previous periodic recurrence of the particular control-channel cycle.

14. The method of claim 13, wherein making the prediction that during the particular control-channel cycle the delay in transmission of one or more control packets will exceed the threshold delay comprises determining that at least a threshold number of control packets are in queue and awaiting transmission from the RAN to access terminals.

15. The method of claim 10, wherein making the determination that during the particular control-channel cycle the delay condition exists in transmission of the at least one control packet comprises making a threshold determination that a threshold number of access terminals are eligible for receiving control messages from the RAN during the particular control-channel cycle, wherein the threshold determination is made during an interval selected from the group consisting of the particular control-channel cycle, and a previous periodic recurrence of the particular control-channel cycle.

16. The method of claim 15, wherein the wireless communication system operates according to a CDMA family of protocols, wherein the particular control-channel cycle is one cycle of a particular, periodically-recurring EVDO control-channel cycle, and wherein making the threshold determination that the threshold number of access terminals are eligible for receiving control messages from the RAN during the particular control-channel cycle comprises determining that the threshold number of access terminals have hashed to the particular, periodically-recurring EVDO control-channel cycle during which they monitor for respective page messages.

17. The method of claim 10, further comprising interlacing up to $M-2$ additional sequences of control-channel time slots, each of the additional sequences containing N control-channel time slots indexed in increments of 1 from 1 to N, the N control-channel time slots of each of the additional sequences being periodically spaced every M time slots thereby yielding a total time duration of each of the additional sequences of $(N-1) \times M+1$ time slots, and each of the additional sequences bearing control-channel data respectively associated with one of up to $M-2$ additional control packets, whereby there is a total J control packets in J respective sequences of control-channel time slots, including the first and second control packets in the first and second sequences, wherein $2 \geq J \geq M$, and wherein correspondingly-indexed control-channel time slots of each of the J respective sequences are scheduled one after another, thereby reducing a total delay in transmission of the J control packets by $(J-1) \times [(N \times M)-1]$ time slots compared with a total delay resulting from sequentially transmitting each of the J control packets in its entirety with an inter-packet delay of $M-1$ time slots between each of the J control packets.

18. In a wireless communication system that includes a Radio Access Network (RAN), and in which control messages are transmitted during repeating control-channel periods each comprising K consecutive control-channel cycles, each control-channel cycle spanning L time slots and recurring with a period of K control-channel cycles, wherein $K \geq 1$ and $L \geq 1$, an improvement comprising:

means for scheduling transmission of control messages to a plurality of access terminals by making each access terminal of the plurality eligible to receive control messages during each periodic recurrence of at least one of the K consecutive control-channel cycles;

means for, on a radio frequency interface, during each control-channel cycle, transmitting control packets sequentially in time, wherein the control packets include a first and a second control packet, wherein each control packet is subdivided and transmitted as control-channel data in a sequence of N control-channel time slots that are spaced every M time slots and are interlaced with traffic-channel time slots bearing traffic-channel data, and wherein N≧1 and M≧2;

means for making a determination that during a particular control-channel cycle a delay condition exists in transmission of at least one control packet; and means for, in response to the determination, during the particular control-channel cycle, interlacing transmission of at least (i) control-channel data in a first sequence of control-channel time slots associated with the first control packet and (ii) control-channel data in a second sequence of control-channel time slots associated with the second control packet, by means for interlacing control-channel time slots of the first sequence with control-channel time slots of the second sequence, wherein means for making the determination that during the particular control-channel cycle the delay condition exists in transmission of the at least one control packet comprise:

means for measuring a delay in transmission of one or more control packets that exceeds a threshold delay,
wherein the delay is measured during an interval selected from the group consisting of the particular control-channel cycle, and a previous periodic recurrence of the particular control-channel cycle;

means for making a prediction that during the particular control-channel cycle a delay in transmission of one or more control packets will exceed a threshold delay,
wherein the prediction is made during an interval selected from the group consisting of the particular control-channel cycle, and a previous periodic recurrence of the particular control-channel cycle; and means for making a threshold determination that a threshold number of access terminals are eligible for receiving control messages from the RAN during the particular control-channel cycle,
wherein the threshold determination is made during an interval selected from the group consisting of the particular control-channel cycle, and a previous periodic recurrence of the particular control-channel cycle.

19. The improvement of claim 18, wherein the wireless communication system operates according to a CDMA family of protocols,
wherein K=12, L=256, N=8, and M=4,
wherein the control-channel period is a 12-cycle EVDO control-channel period,
and wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message.

20. The improvement of claim 18, wherein the wireless communication system operates according to a CDMA family of protocols,
wherein the particular control-channel cycle is one cycle of a particular, periodically-recurring EVDO control-channel cycle,
wherein means for making the prediction that during the particular control-channel cycle the delay in transmission of one or more control packets will exceed the threshold delay comprise means determining that at least a threshold number of control packets are in queue and awaiting transmission from the RAN to access terminals,
and wherein means for making the threshold determination that the threshold number of access terminals are eligible for receiving control messages from the RAN during the particular control-channel cycle comprise means for determining that the threshold number of access terminals have hashed to the particular, periodically-recurring EVDO control-channel cycle during which they monitor for respective page messages.

21. The improvement of claim 18, wherein the N control-channel time slots of each of the first and second sequence of control-channel time slots are indexed in increments of 1 from 1 to N,
wherein each of the first and second sequence of control-channel time slots has a total time duration of (N−1)×M+1 time slots,
and wherein means for interlacing control-channel time slots of the first sequence with control-channel time slots of the second sequence comprise means for scheduling each control-channel time slot of the second sequence immediately following a correspondingly-indexed control-channel time slot of the first sequence, thereby reducing a total delay in transmission of the first and second control packets by (N×M)−1 time slots compared with a total delay resulting from transmitting the first control packet in its entirety followed by transmitting the second control packet in its entirety, with an inter-packet delay of M−1 time slots in between the first and second control packet.

22. The improvement of claim 21, further comprising means for interlacing up to M−2 additional sequences of control-channel time slots,
wherein each of the additional sequences contains N control-channel time slots indexed in increments of 1 from 1 to N, the N control-channel time slots of each of the additional sequences being periodically spaced every M time slots thereby yielding a total time duration of each of the additional sequences of (N−1)×M+1 time slots,
and wherein each of the additional sequences bears control-channel data respectively associated with one of up to M−2 additional control packets,
whereby there is a total of J control packets in J respective sequences of control-channel time slots, including the first and second control packets in the first and second sequences, wherein 2≧J≧M,
and wherein correspondingly-indexed control-channel time slots of each of the J respective sequences are scheduled one after another, thereby reducing a total delay in transmission of the J control packets by (J−1)×[(N×M)−1] time slots compared with a total delay resulting from sequentially transmitting each of the J control packets in its entirety with an inter-packet delay of M−1 time slots between each of the J control packets.

* * * * *